United States Patent [19]

Campbell et al.

[11] 4,231,995

[45] Nov. 4, 1980

[54] AMMONIA DOUBLE-ALKALI PROCESS FOR REMOVING SULFUR OXIDES FROM STACK GASES

[75] Inventors: Ivor E. Campbell, New Albany, Ohio; James M. Henderson, New Brunswick, N.J.; Walter Johnson, El Paso, Tex.; William H. Wetherill, Staten Island, N.Y.

[73] Assignee: Smelter Control Research Association, Inc., New York, N.Y.

[21] Appl. No.: 944,797

[22] Filed: Sep. 22, 1978

[51] Int. Cl.$^3$ .............................. C01B 17/00
[52] U.S. Cl. ................. 423/242; 423/512 A
[58] Field of Search .............. 423/242 A, 243, 512 A, 423/166, 242 R

[56] References Cited

U.S. PATENT DOCUMENTS

| Re. 21,631 | 11/1940 | Johnstone | 423/242 |
|---|---|---|---|
| 1,740,342 | 12/1929 | Hansen | 423/242 |
| 2,082,006 | 6/1937 | Johnstone | 423/242 |
| 2,405,747 | 8/1946 | Hixson et al. | 423/242 |
| 3,579,296 | 5/1971 | Cann | 423/242 A |
| 3,695,829 | 10/1972 | Griffin et al. | 423/242 |
| 3,843,789 | 10/1974 | Spector et al. | 423/242 |
| 3,880,983 | 4/1975 | Welty et al. | 423/242 |
| 3,944,649 | 3/1976 | Field et al. | 423/242 |

FOREIGN PATENT DOCUMENTS

50-21980  8/1975  Japan ...................... 423/242 A

OTHER PUBLICATIONS

C+EN, vol. 50, Sep. 11, 1972, pp. 55–56.
Chemical Engineering Progress, vol. 69, No. 12, 47–53, (1973), "Sulfur Dioxide Removal in a Double Alkali Plant," Cornell et al.
Limestone-Wet Scrubbing Pilot Plant at Colbert Power Plant, Oct. 1973, TVA.
Removal of Sulfur Oxides from Waste Gases, Feb. 1973, TVA.

*Primary Examiner*—O. R. Vertiz
*Assistant Examiner*—Gregory A. Heller
*Attorney, Agent, or Firm*—James F. Haley, Jr.

[57] ABSTRACT

An ammonia-based double-alkali process for removing sulfur oxides from stack gases. In this process, usually continuous, stack gases are contacted with an aqueous wash liquid containing ammonium sulfite as a sulfur oxide reactive compound to form a spent absorbent liquor containing bisulfite, sulfite and sulfate salts of ammonia. A portion of the reactive compound is regenerated by reacting the spent scrubbing liquor with a source of calcium ions, usually limestone. During the regeneration, calcium sulfite solids are precipitated as a by-product, any gypsum solids precipitation during the process being tolerated for a time insufficient to degrade substantially process performance. The resultant calcium solids are separated from the regenerated liquor which is returned for further contact with the stack gases, a portion of these solids being recycled to the regeneration stage. The process is preferably regulated by monitoring and controlling of the calcium concentration of the regenerated liquor, upset conditions being corrected by the addition of make-up ammonia during regeneration of the liquor.

11 Claims, 1 Drawing Figure

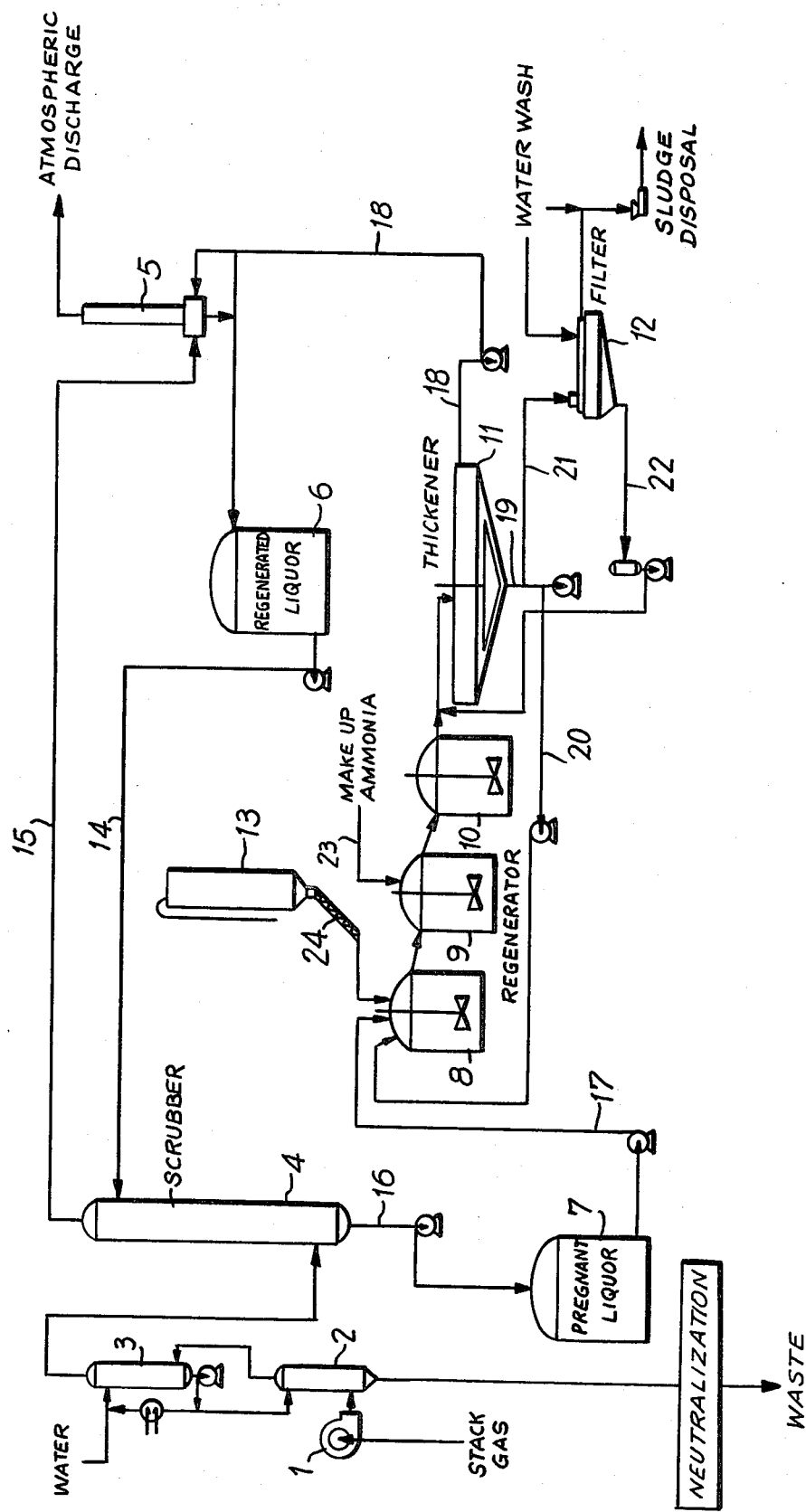

AMMONIA DOUBLE-ALKALI PROCESS FOR REMOVING SULFUR OXIDES FROM STACK GASES

BACKGROUND OF THE INVENTION

This invention relates to the removal of sulfur oxides from flue gases. More particularly, the invention is directed at a novel ammonia double alkali process for the extraction of sulfur oxides from furnace waste gases. This process of absorption and regeneration is usually cyclic. It comprises an ammonia-based extraction of sulfur oxides from a gas; calcium regeneration of the used scrubbing liquor with separation and disposal of the sulfur by-product, a portion of these solids being recycled to the regeneration stage; and recycle of the now regenerated liquor for further sulfur oxide extraction.

Sulfur dioxide ($SO_2$) and sulfur trioxide ($SO_3$) are air pollutants. Sulfur dioxide and to a lesser extent sulfur trioxide are present in stack gases resulting from the combustion of coal, oils and other fuels which contain sulfur, from pyrometallurgical operation involving sulfide ores, and from power generation, and various other chemical and petroleum operations.

Accordingly, many processes have been developed to remove sulfur oxides from atmospheric discharges of waste gases. Those processes finding effective use in commercial applications must remove sulfur oxides from waste gases with high process and equipment reliability, result in minimum added cost in equipment, material or energy, and produce a by-product which is easily and safely disposable. It should however be recognized that even ideal scrubbing processes and equipment represent a major added cost to industrial operations.

Presently, the most favored commercial processes for waste gas cleaning are aqueous systems containing lime or limestone. One class of these wet scrubbing processes is based on the reaction of lime or limestone with sulfur oxides to produce various sulfur salts of calcium, the insoluble calcium salts being removed from the system. U.S. Pat. Nos. 3,883,639, 3,980,756, and 4,024,220 illustrate these systems. The single scrubber circulating loop of this first class of conventional lime or limestone processes is seriously disadvantaged by scale formation. This scale causes numerous operating problems, uneconomical operating costs, and low process reliability. Moreover, sulfur oxide removal efficiencies of conventional single alkali scrubbing processes are often too low to meet the more strict waste gas standards now required of industry.

To avoid these disadvantages inherent in former single alkali processes, commercial operations are beginning to investigate and utilize double alkali processes wherein the former single stage process has been split into a number of intermediate steps designed to improve the reliability of operation, utilization of material, sulfur oxide removal efficiency, and handling properties of the solid waste. For example, whereas in conventional single alkali processes the absorption of sulfur oxide from flue gas and production of waste product occur primarily in a single reactive step, in double alkali processes sulfur absorption and waste production are separated through the use of an intermediate soluble alkali absorption stage. Oxide absorption and waste product production then occur in separate system components. Such separation accomplishes two important objectives.

First, it permits flue gas scrubbing with a soluble alkali, thus the rate of the sulfur oxide absorption is limited by the rate of transfer from the flu gas to the scrubbing liquor. In former systems, the rate of lime/limestone dissolution was also an important factor limiting the rate of the scrubbing reaction. Therefore, double-alkali systems have the potential for higher oxide removal efficiencies than the former single alkali systems. Additionally, the use in double alkali systems of other than calcium containing scrubbing liquors minimizes calcium concentrations in the scrubber and piping so as better to prevent scaling and plugging in these critical areas. Finally, relegation of the lime/limestone reaction to a location more specifically designed for this chemical exchange increases the potential for high lime/limestone utilization in double-alkali processes.

There are a number of double-alkali processes described in the art. For example, sodium or other alkali metal-based processes are disclosed in N. Kaplan, "Introduction To Double-Alkali Flue Gas Desulfurization Technology", EPA Flue Gas Desulfurization Symposium, New Orleans, La., Mar. 8-11, 1976 and U.S. Pat. Nos. 3,775,532, 3,883,639, 3,944,649, 3,961,021, 3,965,242, 3,987,149, 3,989,796, and 3,989,797.

Ammonia-based sulfur scrubbing processes are also described in the art, for example in U.S. Pat. Nos. 1,740,342, 2,082,006, (Re. 21,631), 2,405,747, 3,579,296, 3,695,829, 3,843,789, 3,880,983 and 3,944,649. These processes employ heat, acidification and crystallization, alkaline earth metal oxides, or alkaline earth metal hydroxides to regenerate the used scrubbing liquors.

These conventional soluble alkali processes, although displaying more efficient sulfur oxide removal from flue gases, are still disadvantaged by inferior sulfate removal during the precipitation and regeneration stage, sulfate being produced in scrubbing systems by oxidation of sulfur dioxide and sulfites. Failure to remove sulfate contaminants during regeneration, a difficult task as calcium sulfate is more soluble than calcium sulfite in aqueous solutions over wide pH ranges, reduces the sulfur oxide absorption capability of the regenerated liquor by tying up ammonia values making them unavailable for further sulfur scrubbing. Moreover, sulfate concentration build-up can adversely affect alkali utilization during regeneration, contribute to gypsum scaling in the scrubber and other process equipment, and eventually lead to shut down of the chemical absorption-regeneration process. Therefore, avoidance of sulfate build-up is critical to any long term operation of these scrubbing systems. E.g., U.S. Pat. No. 3,579,296, column 3, lines 5-19.

Numerous attempts have been made in the art to avoid such destructive increases in liquor sulfate concentration. Most are techniques directed to encourage more effective removal of sulfate during regeneration usually as solid calcium sulfate or gypsum, gypsum being more soluble in aqueous solutions than calcium sulfite, the other major waste product. One such process is described in U.S. Pat. No. 2,082,006. There, the acidity of the lime/limestone regeneration solution is increased to prevent the precipitation of calcium sulfite and encourage calcium sulfate precipitation.

Another technique, described in U.S. Pat. No. 2,405,747, suggests removing a bleed stream from the regenerated liquor and reacting it with lime or limestone under conditions designed to precipitate gypsum from the partially regenerated liquor and thus prevent sulfate build-up in the liquor. Other bleed stream extractive techniques are disclosed in U.S. Pat. Nos. 2,086,379, 2,128,027, 3,695,829, 3,961,021, 3,965,242.

A third technique, described in U.S. Pat. Nos. 3,579,296, 3,873,532, 3,972,980, 3,980,756, provides a settling means following regeneration with a recycle of a portion of the settled solids to the regeneration stage to promote desupersaturation of the recausticized liquor relative to calcium sulfate and precipitation of gypsum. The recausticized liquor from this process must have the high calcium content consistent with gypsum precipitation. Therefore, it cannot be reused in the sulfur oxide extractive process without further treatment since high calcium concentrations in the scrubbing liquor contribute to scaling and reduce lime/limestone utilization efficiency. Accordingly, the regenerated liquor is usually treated with soda ash to reduce the calcium ion concentration to levels more acceptable to subsequent sulfur oxide scrubbing.

Another method disclosed, for example in U.S. Pat. No. 3,775,532, employs a two step regeneration process. First, the spent scrubbing solution containing both absorbed sulfite and sulfate ions is treated with limestone to precipitate and remove calcium sulfite. Then, the partially regenerated liquor is treated with lime to remove the sulfate as gypsum. Again calcium concentrations in the regenerated liquor are excessive and disadvantage later scrubbing and regeneration. Other multistage regenerations are disclosed in U.S. Pat. Nos. 3,944,649 and 3,987,149. In this regard it is noteworthy that the Environmental Protection Agency in EPA Report 600/7-77-050b has concluded that there is no viable approach which eanbles the use of limestone alone for regeneration of liquors having significant amounts of sulfate, even though there are considerable economic incentives for the substitution of limestone for lime in double alkali processes.

Therefore, while some of these techniques have been successful in limiting the concentration of sulfate in the regenerated liquor, all have required additional material, equipment, stages or bleed stream treatments to encourage the necessary gypsum precipitation. Moreover, failure subsequently to reduce those calcium levels necessary for gypsum precipitation from the process liquors contributes to scaling in the scrubber and disadvantages other process stages. Therefore other equipment, stages and treatment are necessary to remove that excess calcium ion inherent in regeneration schemes operated in the gypsum precipitation mode.

SUMMARY OF THE INVENTION

Accordingly, it is an object of this invention to provide an ammonia-based double alkali process for sulfur oxide removal from flue gases wherein only a single regeneration is required to regenerate the scrubbing liquor.

It is another object of this invention to provide a process of ammonia based sulfur oxide scrubbing wherein limestone alone is used for both scrubbing liquor regeneration and sulfate removal.

It is a further object of this invention to provide a scrubbing process wherein the calcium concentration of the regeneration liquor is maintained substantially at all times below that chemically required for gypsum precipitation to discourage the precipitation of gypsum during regeneration, any gypsum solids precipitation during the process being tolerated for a time insufficient to degrade substantially process performance.

It is still another object of this invention to provide a process wherein the sulfate ion concentration of the liquor is restricted to an acceptable level during continuous operation, sulfate ions above this steady state level being substantially removed as other than gypsum precipitate during non-upset conditions.

It is another object of the process of this invention to provide good sulfur oxide scrubbing efficiency, to achieve good calcium source utilization and to convert sulfur oxide pollutants into an easily disposable waste product.

It is a still further object of this invention to provide a method of monitoring and rapidly controlling upset process conditions so as to maintain process reliability and efficiency over extended periods of time.

These and other additional objects and advantages of this invention, apparent from the detailed description and claims which follow, are accomplished by a process, preferably continuous, for removing sulfur oxide from stack gases, comprising the steps of contacting stack gases with an aqueous wash liquid comprising ammonium sulfite as a sulfur oxide reactive compound to form a spent absorbent liquor containing bisulfite, sulfite and sulfate salts of ammonia; regenerating at least a portion of the reactive compound and precipitating calcium sulfite solids by reacting the spent absorbent liquor with a source of calcium ions, any gypsum solids precipitation during the process being tolerated for a time insufficient to degrade substantially process performance; separating the precipitated calcium solids from the regenerated liquid; returning at least a portion of the separated calcium solids to the regeneration step; and further contacting stack gases with the regenerated liquid.

The further recognition that the calcium concentration of the process liquor is an important factor in the smooth operation of the described continuous scrubbing process is also part of this invention. Control of this concentration is essential to the long-term effectiveness of the process. In accordance with this process, the calcium concentration of the process liquor is at substantially all times kept below that necessary for gypsum solids precipitation. Any operation in the gypsum precipitation mode is only tolerated in accordance with this process for a time insufficient to degrade substantially process performance.

It is a further embodiment of this invention that the monitoring of the calcium concentration of the regenerated liquor allows effective process control. Moreover, under process upset conditions, it has been unexpectedly found that the addition of free ammonia to the process liquor overcomes upset and corrects the operation of the process, returning it to its usual high scrubbing efficiency, calcium source utilization and effective waste disposal. Such restoration is apparently the result of a reduction of calcium concentration by calcium sulfite precipitation.

BRIEF DESCRIPTION OF THE DRAWING

FIG. 1 is a schematic diagram of a system according to the invention.

DETAILED DESCRIPTION OF THE INVENTION

In the system illustrated in FIG. 1, sulfur oxide bearing waste gases are drawn from a stack or flue by feed gas blower 1, humidified in 2 and cooled in a packed cooling tower 3. Such gas pretreatments are wellknown in the art and form no part of this invention. In the scrubber 4, the gas flow countercurrent to an aqueous wash liquor comprising ammonium sulfite as a sulfur oxide reactive compound through a packed tower 4. The tower may also include polypropylene saddles. Preferably, the sulfur oxide reactive compound is ammonium sulfite. The countercurrent wash of gas by this liquor is common to most ammonia-based scrubbing processes. The scrubbing liquor is supplied through line 14 in the cyclic process shown in FIG. 1.

Subsequent to such scrubbing, the cleansed gas may be discharged through line 15 to the stack and then to the atmosphere or further treated such as in a wet electrostatic precipitator 5 as shown in FIG. 1 before atmospheric discharge.

The pregnant or spent absorbent liquor after scrubbing contains bisulfite, sulfite, and sulfate salts of ammonia. As is well recognized in the art the sulfate portion of the spent liquor is formed by oxidation of the sulfite portion of the gas or liquor and absorption of sulfur trioxide or acid mist from the gas stream.

In the embodiment shown in FIG. 1, the pregnant or spent liquor is discharged into holding tank 7 along line 16 before being pumped so as to maintain a continuous flow along line 17 to the regeneration stage of the process of this invention. In the embodiment shown, this regeneration is accomplished in three consecutive regeneration tanks 8, 9, and 10. However, it should be understood that other regeneration arrangements are equally appropriate to the process of this invention.

In regeneration tank 8, the spent liquor is combined with a source of calcium ions for example from hopper 13 thru feeder 24. Any of the large number of sources of calcium ions recognized in the art for regeneration systems, such as lime, limestone and hydrated lime, may be used in this process. In the preferred embodiment of this invention the calcium source is limestone. It is usually added in an amount about 5% in excess of the average stoichiometric requirement for bisulfite neutralization, although stoichiometric equivalence is preferred. Preferably, the limestone is ground to minus 100 mesh before feeding to tank 8 as a wet slurry or a dry powder, the latter being more preferred due to avoidance of scaling problems during preparation and delivery of a slurry. While the preferred single limestone feed is depicted in FIG. 1, it should be understood that split feeding or other methods may also be used to good effect in the process of this invention. In the embodiment of FIG. 1, the resultant slurry flows by gravity to additional regeneration tanks 9 and 10.

The effluent from regeneration tank 10 is pumped to a standard thickener 11. The overflow from this thickener is pumped through line 18 to regenerated liquor holding tank 6 from which it can be recycled to the absorption system. As shown in FIG. 1, a portion of this liquor passes to the electrostatic precipitator 5 before reaching holding tank 6. In accordance with the process of this invention, there is no necessity for filtration of the thickener overflow or for reduction of its calcium content prior to its recycle to the absorption system.

The underflow from the thickener exits the thickener through line 19. It usually contains calcium sulfite solids, limestone gangue, unreacted limestone and in some cases calcium sulfate solids. A portion of the underflow is recycled via line 20 to first regeneration tank 8. The remainder of the thickener underflow is pumped via line 21 to filter 12 where it is washed to recover ammonia values and then discharged for sludge disposal. The filtration of the thickener underflow is common in the art. More preferably, a belt or drum filter is employed to separate and wash the sludge, a horizontal belt filter being preferred. The filtrate from this process is most usually recycled to the thickener as along line 22 so as to make its ammonia values available for subsequent scrubbing. This specific recycle path as compared to direct combination with the regenerated liquor, avoids the necessity of filtering suspended solids from this filtrate. If permitted to remain in the liquor, these solids would contribute to scaling in the absorption tower and foul the process.

One of the important attributes of this invention is the recognition that the calcium concentration of the process liquor plays an important role in the smooth operation of the entire process. Further, it has been found that calcium concentrations below those chemically required for gypsum precipitation still permit effective removal of sulfate ions and avoid the destructive sulfate build-up noted in prior art processes. This discovery is unexpected since the prior art consistently taught that to remove sulfate ions, gypsum precipitation had to be encouraged not discouraged as in the process of this invention. Operating at the low calcium levels favored by this invention, usually between about 500 ppm and 800 ppm and more preferably below about 600 ppm as measured in the last of the regeneration tanks 10, provides up to 95% limestone utilization, effective sulfur oxide scrubbing, and good filtration characteristics for the precipitated solids.

While not wishing to be bound by theory, it is believed that a substantial portion of any sulfate ions in the system is removed therefrom not as gypsum but as a calcium sulfite-sulfate double salt. X-ray diffraction analysis of these double salts suggests that no sulfate exists in the form of gypsum, the sulfate ions rather occupying positions in the calcium sulfite hemihydrate crystal lattice. It should be understood that while the aim of this invention is to discourage gypsum precipitation, operation under conditions wherein gypsum precipitation occurs to any substantial extent may be permitted for short periods of time without departing from the scope of this invention. However, any long-term operation in this upset mode cannot be tolerated. Such gypsum mode operation results in at best poor system reliability and performance and at worst shut down. In the preferred embodiment of this process substantially no sulfate is precipitated as gypsum during regeneration.

It is a further attribute of this invention that the phenomenon of "limestone blinding" observed in most other calcium regeneration processes is avoided and if necessary corrected in accordance with this invention. "Limestone blinding" implies that the limestone present in the regeneration tanks does not act to neutralize the sulfur containing salts of the pregnant or spent liquor. It is believed that such blinding occurs due to solids precipitation on the surface of the limestone, restricting further limestone reaction with the spent liquor. In fact, U.S. Pat. No. 3,708,266, employs a grinding mill to remove such occluding precipitate from the limestone surface in order to restore its neutralization activity.

While it has been suggested that further limestone additions ought to cure this problem of blinding or seemingly unreactive pregnant solutions, such additions in the process of the invention act only to exacerbate the condition. Moreover, such additions also raise the calcium concentration of the liquor and thereby effectively disadvantage the entire process. It is thus a discovery of this invention that a reduction of the calcium concentration of the regenerating liquor cures both these problems. Further, it has been discovered that the addition of make-up ammonia to the regeneration tank so as to raise the pH of the liquor therein unexpectedly reduces the calcium ion concentration by precipitating it as calcium sulfite and corrects any limestone blinding or unreactive liquor conditions. Moreover, this addition rapidly restores the system to its more preferred non-gypsum precipitation mode of operation. Such addition may also be used to correct upset conditions caused by other process variations and operator error or miscalculations.

Although make-up ammonia may be added while continuing limestone addition, such combination is actually counter-productive, the limestone addition serving to raise the calcium concentration and the ammonia tending to lower it. Preferably, the limestone feed is interrupted during ammonia addition. However, it should be noted that ammonia may be added to good effect even while continuing limestone addition if it is added so as to raise the pH of the liquor quickly to about 6.0 to 6.2. At this pH it is believed that limestone dissolution slows sufficiently to accomplish the desired calcium concentration lowering sought by ammonia addition.

Referring to FIG. 1, the described make-up ammonia feed is depicted through line 23 to regeneration tank 9. It should also be understood that in the absence of upset conditions ammonia feed to maintain normal material balances may be made at the more usual parts of the cycle, for example to the regenerated liquor holding tank 6 or to the scrubber 4 itself.

It has further discovered that "limestone blinding" can be substantially avoided by recycle of a portion of the thickener underflow to the regeneration tank. Such underflow recycle is depicted in FIG. 1 through line 20 to regeneration tank 8. It is believed that such recycle provides another surface for precipitation in competition with the limestone surface. Such underflow apparently prevents any substantial limestone blinding from degrading the process and reducing limestone utilizations. It has also been observed that the recycle of thickener underflow so improves calcium sulfite crystal growth and nucleation that the solids are easily filterable and no added filtration is needed prior to return of the thickener overflow to the scrubber.

In order to describe the present invention so that it may more clearly be understood, the following example is set forth. This example is primarily for the purpose of illustration and any specific enumeration therein should not be construed as a limitation.

EXAMPLE

In this example, the process of this invention was tested in a pilot plant over an extended period of time. The more usual operating conditions of the process are listed throughout. The stack gas scrubbed had a sulfur dioxide concentration of about 0.5 to 1% by volume. It was contacted with an adequate flow of absorber feed containing 20–30 grams per liter of ammonium sulfite at pH 5.5–5.9 to convert the reactive sulfite into ammonium bisulfite and sulfate salts.

The observed sulfur oxide removal efficiency is dependent on a wide number of variables but it is feasible to control the amount of sulfur dioxide in the atmospheric exhaust gas by keying the flow rate of a liquor of proper ammonium sulfite concentration to the desired removal efficiency level. It is well established that ammonia scrubbing affords above 90% sulfur oxide removal efficiencies. In the process of this invention similar efficiencies were attained.

The pregnant or spent liquor had a concentration of 6–10 grams of sulfur as sulfite and 16–20 grams of sulfur as sulfate during most of the process operation. The calcium ion concentration of this liquor was usually below about 600 ppm. During some conditions of upset, the calcium concentration rose to about 1200ppm but correction was initiated before such concentration permitted gypsum precipitation to occur over a time sufficient to degrade substantially process performance.

Limestone was preferred for regeneration of the spent liquor. Usually, it was fed directly in a single stream at below minus 100 mesh to the first regeneration tank. It usually was added in an amount about 5% in excess over that stoichiometrically calculated on a neutralization basis, but exact stoichiometric amounts are preferred. The limestone was usually added at a constant rate in the continuous process of this example, the addition rate being decreased if the limestone utilization rate fell below about 90%. The retention of the spent liquor in the regeneration system at flow rates of 60–180 gpm was about 270–90 minutes. The reaction proceeded in the most desirable manner to pH levels of about 5.5–5.9. Under normal operating conditions, liquor retention times in regeneration of about 90 minutes were usually adequate. Limestone utilizations in this process ranged between 90 and 98%.

When limestone utilization fell below 90% even in the presence of excess limestone, it was found that the pH of the solution ranged between 5.0 and 5.3. Under these conditions the regeneration reaction became sluggish and eventually stalled. It is postualted that these conditions are symptomatic of limestone blinding. Moreover, the now sluggishly reacting liquors displayed calcium concentrations well above the 500–800 ppm range preferred in accordance with this invention, these high calcium concentrations favoring gypsum precipitation. Recycle of thickener underflow in large measure prevented this disfavored build-up of calcium concentrations and promoted rapid regeneration without pH drop and limestone blinding.

During these pilot plant operations, the scrubbing process occasionally operated for short periods of time in the gypsum precipitation mode. Operation under these upset conditions was at times planned and at other times caused by other factors. It was found that in either case the addition of make-up ammonia to the regeneration system during upset raised the pH, reduced the calcium concentration, and again afforded the desired reaction rate and limestone utilization. Ammonia additions are effective if done with interruption of limestone feed or when done during continuation of limestone feed if done so as rapidly to raise the liquor pH to between about 6.0 and 6.2.

The composition and structure of the precipitate formed during regeneration is dependent on the calcium, sulfite, and sulfate concentrations at the solid-liquid interface of the crystallization process. X-ray diffraction and chemical analysis showed that the precipitate was usually a calcium sulfite-sulfate double salt. Diffraction analysis showed only the calcium sulfite hemihydrate lattice with gypsum being below the limits of detection. Chemical analysis, however, showed that up to 20–25% of the sulfur in the precipitate was present as sulfate. It is postulated that these sulfate ions occupied positions in the sulfite hemihydrate crystal lattice. The maximum percentage of sulfur that could be precipitated as sulfate without gypsum precipitation could not be precisely determined.

In a few cases some gypsum was found in the precipitate. Although the gypsum containing precipitate was more easily filtered, it was observed that when the process operated in the gypsum precipitation mode for more than short periods of time, the regeneration rate slowed, precipitation continued in the thickener, and limestone utilization was poor. Continued operation in the gypsum precipitation mode resulted in system shut down. Therefore, while operation of the process of this invention in the gypsum precipitation mode is permitted for short periods of time, gypsum precipitation cannot be tolerated for a time sufficient to degrade substantially process performance.

The thickener used in this process was designed to handle 150 gpm of slurry containing up to 6% solids and to produce an overflow containing less than 300 ppm solids and an underflow containing about 20-35% solids. During operation, the slurry fed to the thickener had a solids content of 4-5% (weight), the underflow having about a 30% solids content. Usually about a 15 gpm underflow recycle to the first regeneration tank was maintained during process operation.

Filtration of the thickener underflow afforded a filter cake suitable for disposal. Preferably, a horizontal-belt filter was used. The actual unit had a 12 inch wide belt, a 10.5 ft$^2$ of active belt area, and a variable speed of 7-28 feet per minute. The filter cake was water washed to recover soluble ammonium salts. The quantity of wash water used should not exceed that discharged in the filter cake and lost via evaporation, wash water recycle being preferred. Water in excess to that so lost during the process tends to dilute the process liquors and requires large volume concentration equipment. The ammonia content of the washed filter cake varied from 0.2 to 2%. More usually it was about 0.5% on a dry basis.

The filter cakes were thixotropic as produced but hardened on standing. Based on the operation of this process, it was estimated that with 90% utilization of limestone containing 90% calcium carbonate, a calcium sulfite precipitate containing 20% (by weight) sulfate, and a filter cake containing 50 percent (by weight) uncombined water, 9.7 tons of wet cake would be produced per ton of sulfur discharged in the cake.

While I have hereinbefore presented a number of embodiments of this invention, it is apparent that my basic construction can be altered to provide other embodiments which utilize the process of this invention. Thus, it will be appreciated that the scope of my invention is to be defined by the claims appended hereto rather than the specific embodiments which have been presented hereinbefore by way of example.

I claim:
1. A process for removing sulfur oxide from stack gases comprising:
   (a) contacting said stack gases with an aqueous wash liquid comprising ammonium sulfite as a sulfur oxide reactive compound to form a spent absorbent liquor containing bisulfite, sulfite and sulfate salts of ammonia;
   (b) regenerating at least a portion of the reactive compound and precipitating calcium sulfite solids by treating the spent absorbent liquor with a source of calcium ions, the calcium ion concentration of the regenerated liquor being maintained between about 500 and 800 ppm at substantially all times and the pH of the regenerated liquor being maintained between about 5.5 and 6.2 at substantially all times whereby any gypsum solids precipitation in the process is tolerated for a time insufficient to degrade substantially process performance;
   (c) separating the precipitated calcium solids from the regenerated liquor;
   (d) returning at least a portion of the separated calcium solids to the regeneration step; and
   (e) further contacting the regenerated liquor with said sulfur oxide containing stack gases.

2. The process of claim 1 wherein substantially no gypsum solids are precipitated during the process.

3. The process of claim 1 wherein the pH of the regenerated liquor during the process is about 5.5 to 5.9.

4. The process of claim 1 also including the step of adding make-up ammonia to the pregnant liquor during regeneration.

5. The process of claim 4 wherein ammonia is rapidly added to the liquor while continuing calcium ion addition until the pH of the regenerated liquor ranges between about 6.0 and about 6.2.

6. The process of claim 4 wherein ammonia is added to the liquor while interrupting calcium ion addition until the pH of the regenerated liquor ranges between 5.5 and 5.9.

7. The process of claim 1 wherein the source of calcium ion is limestone.

8. In a process for removing sulfur oxide from stack gases which includes the step of contacting stack gases with an aqueous wash liquid comprising ammonium sulfite as a sulfur oxide reactive compound to form a spent absorbent liquor containing bisulfite, sulfite and sulfate salts of ammonia and regenerating the spent absorbent liquor, the improvement comprising regenerating at least a portion of the reactive compound and precipitating calcium sulfite solids by reacting the spent absorbent liquor with a source of calcium ions, the calcium ion concentration of the regenerated liquor being maintained between about 500 and 800 ppm at substantially all times and the pH of the regenerated liquor being maintained between about 5.5 and 6.2 at substantially all times whereby any gypsum solids precipitation in the process is tolerated for a time insufficient to degrade substantially process performance; separating the precipitated calcium solids from the regenerated liquor; returning at least a portion of the separated calcium solids to the regeneration step; and further contacting the regenerated liquor with the sulfur oxide containing stack gases.

9. The process of claim 8 including the step of adding make-up ammonia to the pregnant liquor during regeneration.

10. The process of claim 9 wherein the ammonia is rapidly added to the liquor while continuing calcium addition until the pH of the regenerated liquor ranges between about 6.0 and about 6.2.

11. The process of claim 9 wherein ammonia is added to the liquor while interrupting calcium addition until the pH of the regenerated liquor ranges between 5.5 and 5.9.

* * * * *

UNITED STATES PATENT AND TRADEMARK OFFICE
CERTIFICATE OF CORRECTION

PATENT NO. : 4,231,995

DATED : November 4, 1980

INVENTOR(S) : Ivor E. Campbell, et al.

It is certified that error appears in the above—identified patent and that said Letters Patent is hereby corrected as shown below:

Col. 2, line 3, change "flu" to --flue--.

Col. 3, line 33, change "eanbles" to --enables--.

Col. 7, line 35, insert --been-- after "has".

Col. 8, line 36, change "postualted" to --postulated--.

Signed and Sealed this

Ninth Day of June 1981

[SEAL]

Attest:

RENE D. TEGTMEYER

*Attesting Officer*   *Acting Commissioner of Patents and Trademarks*